B. KOTKOVSKY.
BUTTON ATTACHING MACHINE.
APPLICATION FILED APR. 14, 1914.

1,134,078.

Patented Mar. 30, 1915.
8 SHEETS—SHEET 1.

WITNESSES

INVENTOR
BENJAMIN KOTKOVSKY
BY
ATTORNEYS

B. KOTKOVSKÝ.
BUTTON ATTACHING MACHINE.
APPLICATION FILED APR. 14, 1914.

1,134,078.

Patented Mar. 30, 1915.
8 SHEETS—SHEET 3.

Fig. 3.

WITNESSES
Geo. W. Naylor

INVENTOR
Benjamin Kotkovský
BY Munn & Co
ATTORNEYS

UNITED STATES PATENT OFFICE.

BENJAMIN KOTKOVSKY, OF NEW YORK, N. Y., ASSIGNOR TO THE RAPID BUTTON-ATTACHING MACHINE COMPANY, INCORPORATED, OF NEW YORK, N. Y., A CORPORATION OF NEW YORK.

BUTTON-ATTACHING MACHINE.

1,134,078.

Specification of Letters Patent. Patented Mar. 30, 1915.

Application filed April 14, 1914. Serial No. 831,746.

*To all whom it may concern:*

Be it known that I, BENJAMIN KOTKOVSKY, a subject of the Czar of Russia, and a resident of the city of New York, borough of Brooklyn, in the county of Kings and State of New York, have invented a new and Improved Button-Attaching Machine, of which the following is a full, clear, and exact description.

This invention relates to button attaching machines of that type which includes a mechanism for making, driving and clenching the staples whereby the buttons are attached to shoes, gaiters, leggings and other articles.

The general objects of the invention are to improve the construction and operation of machines of the character referred to so as to be thoroughly reliable and efficient in use, automatic in its various operations, and so designed as to be adapted for use with buttons of different sizes.

One of the specific objects of the invention is the provision of a staple-forming mechanism to which the staple wire is fed automatically in timed relation to the feed of the buttons to be attached by the staples, but which is so controlled that when a button fails to feed to the staple-forming mechanism the feed of the wire is interrupted so that there is no danger of clogging the machine and of staples being driven into the shoe, or other article.

Another object of the invention is the provision of a novel arrangement of staple-forming and driving elements and operating means therefor, in combination with novel, simple and effective means for feeding buttons successively to staple-receiving position, the staple-forming mechanism including a die which is automatically retracted by the staple bender during the last part of the movement of the latter, so as to make way for the staple driver, the parts being so related that the staple driver has imparted thereto an initial return movement to make way for the return of the die to its normal position so as to receive and support the next button to be supplied with a staple.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a side view of the machine with the parts in initial position, the button hopper being shown in section; Fig. 1ª is a sectional view on line 1ª—1ª, Fig. 1, through the button feed chute. Fig. 5 is an enlarged sectional view taken vertically through the machine in a plane parallel with the line of feed of the buttons and of movement of the staple bender and driving elements, the bending and driving elements being shown retracted and about to be moved successively on their working strokes and a staple-forming wire having been fed to a button; Fig. 5ª is a sectional view on line 5ª—5ª, Fig. 5, through the staple-forming and driving mechanism. Fig. 6ª is a perspective view of the actuator for the staple bender and staple driver. Fig. 12 is a side view of the staple bender; and Fig. 12ª is a perspective view of a section of wire from which a staple is formed, the wire being cut obliquely at its ends to form piercing points.

Referring to the drawings, 1 designates the table or shelf of the machine, which is formed with a hub 2 that is suitably fastened to the upper end of a hollow standard or column 3 provided at its lower end with a suitable tripod or base frame (not shown), and extending through this column is an operating rod 4 that has its lower end connected with a depressible spring-raised treadle (not shown) whereby power is applied to the machine for operating the various instrumentalities thereof. On the table 1 is a frame A that supports an inclined chute B that receives buttons from a hopper C in which is a button pick-up means D, which oscillates in a vertical plane in the hopper D, so that buttons can be taken out by the device and delivered to the chute B. At the lower end of the chute is a combined staple-forming and driving mechanism E to which buttons are fed from the chute by an ejector F and a star wheel G, and associated with the staple-forming and driving mechanism E is a wire feeding means H and cutting means I.

Figures 5, 5A:
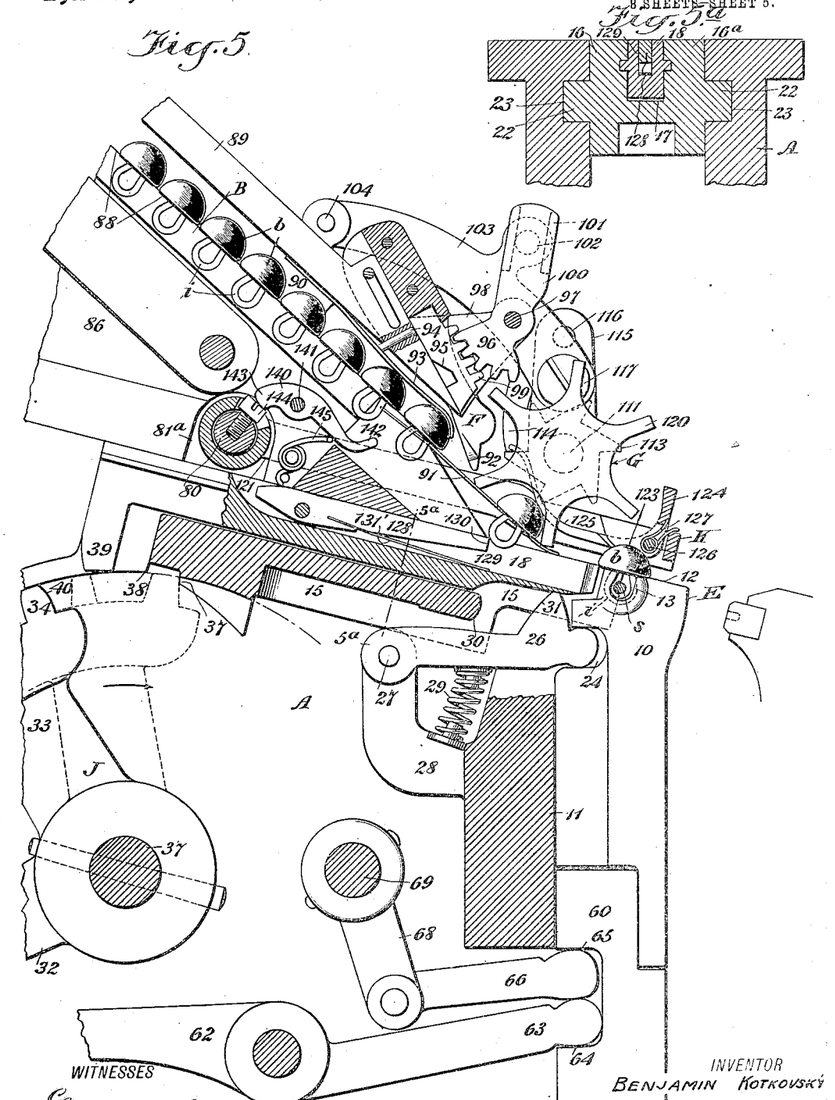
Figure 10:
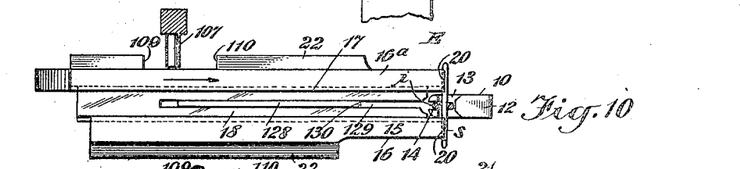
Figs. 10 and 11 are plan views of the staple die, bender and driver, the figures respectively showing the wire before and after being bent into a staple.
Figure 11:
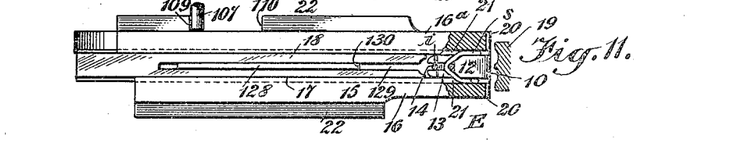

Taking up first the staple-forming and driving mechanism E, reference is to be had to Figs. 5, 6 and 11 and 12. 10 designates a staple-forming die which is vertically movable in a guideway 11 in the front part of the frame A. The upper end of this die is formed into a flat seat 12 on which the head of a button $b$ is adapted to rest, as shown in Fig. 5, and in this seat end of the die is a transverse opening 13 that is adapted to receive a section of wire $s$ from which a staple is formed, as shown in Fig. 10; and also in the upper end of this die is a slot or groove 14 communicating with the wire-receiving opening 13, so that the shank or eye $i$ of a button can enter the die with the head of the button uppermost. Coöperating with the staple-forming die 10 is a staple bender 15 having side members 16 and 16ª spaced apart so that the die will be disposed between the members as the bender moves from the position shown in Fig. 10 to that in Fig. 11 in bending the ends of the wire $s$ into a staple. The bender 15 has a longitudinal channel 17 in which is slidable a staple driver 18 which is moved into engagement with the completed staple to drive the same outwardly into engagement with the anvil or clenching die 19, but before this driving action takes place the staple-forming die 10 is withdrawn downwardly out of the path of the staple driver 18, so that the staple can be carried to the anvil. Before the staple wire $s$ is fed to the staple-forming mechanism E, a button is supplied to the said mechanism in such a position that the shank or eye of the button will lie in the opening 13 of the die. The members 16 and 16ª have their outer edges provided with recesses 20 which receive the wire $s$, and the inner opposed faces of the members of the bender have grooves 21 into which the side members of the staple are guided as the staple is being formed, as shown in Fig. 11, and these grooves serve to support the staple with the button attached thereto, and guide the staple as it is being driven by the driver 18 through the fabric and against the anvil from the position shown in Fig. 11 to that shown in Fig. 6. As the staple is being driven the button is supported on the side members 16 and 16ª of the bender, on which members the button slides. The opposite sides of the bender have horizontal webs or flanges 22 which engage in guide grooves 23 Fig. 5ª, of the opposite side walls of the frame A.

Figure 6:
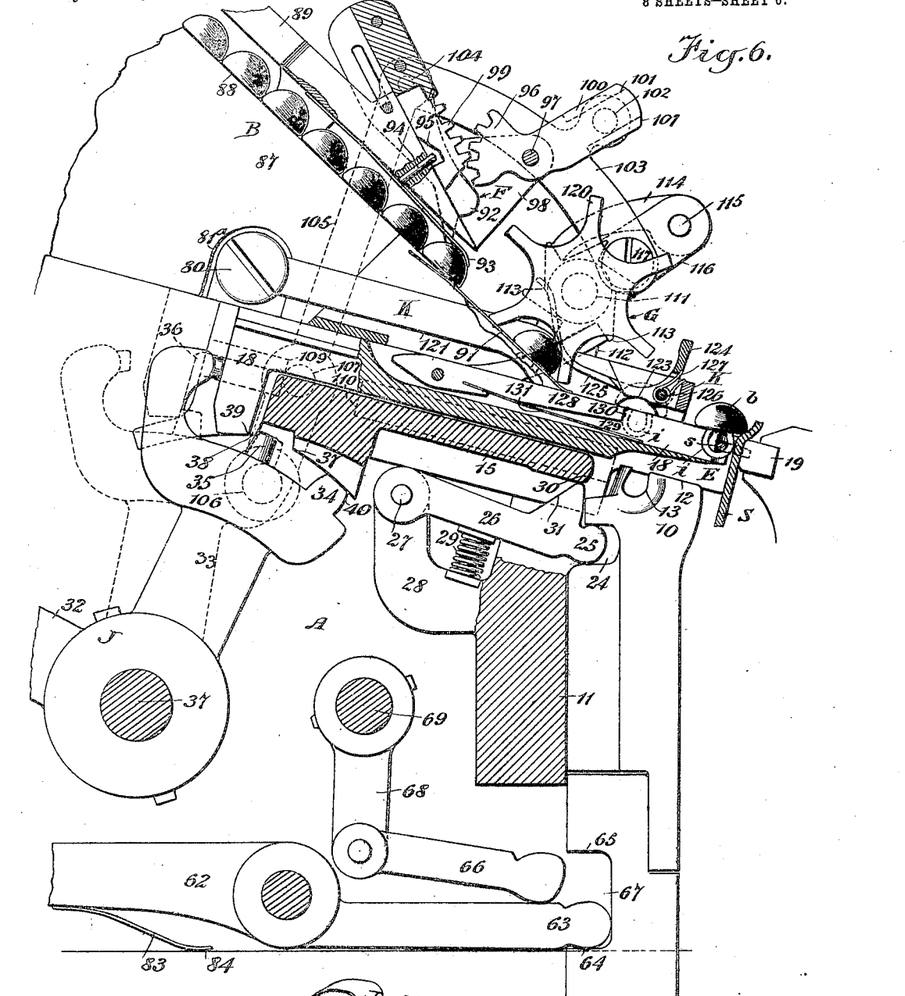
Fig. 6 is a view similar to Fig. 5, showing the staple bender and driving elements at the end of their working strokes and a button attached to a shoe or other article by the staple thereof being clenched.
Figure 6A:
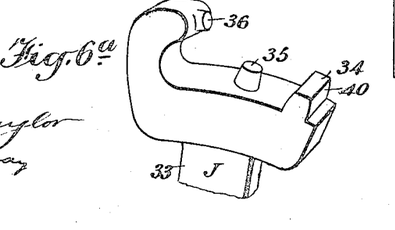

The staple-forming die 10 is vertically reciprocated in timed relation to the movements of the staple bender and driver, and, as shown in Figs. 5 and 6, the die 10 has on its rear side a recess 24 into which engages the front end 25 of a swinging member 26 pivoted at 27 on an arm 28 or other suitable fixed part of the machine; and interposed between the member 26 and the arm 28 is a spring 29 which urges the arm 26 upwardly and carries with it the die 10 to its normal position after the die has been depressed. The depressing of the die is accomplished by the movement of the bender while moving forwardly after having formed a staple. The bender is provided with a wiping portion 30, Figs. 5 and 6, which is adapted to engage a cam or beveled surface 31 extending upwardly from the member 26, so that during the forward movement of the staple bender 15, the member 26 is pressed downwardly after the staple is formed, so as to withdraw the forming portion of the die 10 out of the path of the staple driver 18. As soon as the bender begins to recede, which occurs after the staple driver is partly returned, the spring 29 snaps the member 26 upwardly and quickly raises the die 10 to normal position and in readiness to receive the next button and staple wire.

The actuating means for the staple bending and driving elements comprises a bell crank lever J which has an arm 32 connected with the upper end of the operating rod 4 in the column 3 of the machine, and the other arm 33 is provided with teeth or lugs 34, 35 and 36, which serve to reciprocate the staple bender and driver. The actuating element or lever J oscillates on a horizontal axis 37, so that the teeth 34, 35 and 36 travel in an arcuate path under the rear portions of the staple bender and driver, both of which reciprocate rectilinearly and in tangential relation to the arcuate path of the said teeth or lugs. On the rear end of the staple bender 15 are spaced shoulders or abutments 37 and 38, and on the rear end of the staple driver is an abutment 39, all of which abutments travel in straight lines which cut across the arcuate lines of travel of the teeth 34 and 35. When the parts are in normal position, as shown in Fig. 5, the arm 33 of the actuator moves to the right in a clockwise direction, and the front side 40 of the tooth 34 strikes the shoulder or abutment 37 of the staple bender 15 and moves the latter to the right until the tooth 34 disengages such shoulder 37, when the actuator continues to move with the tooth 34 passing under the bender without actuating the same. Finally the tooth or lug 36 of the actuator engages behind the staple driver 18 and moves the latter to the right to drive the staple through the shoe or fabric S, Fig. 6, for attaching the button b thereto. During this movement of the bender by the actuator the tooth 35 of the latter passes under the projection or abutment 39 of the staple driver, but when the staple driver reaches the end of its driving movement the lug 39 will lie in the path of the tooth 35, so that as the actuator returns or moves to the left the said tooth 35 will engage the abutment 39 and partially retract or return the staple driver to a point where it clears the die 10 and leaves it remaining momentarily because the tooth 35 disengages and passes under the abutment 39. At about this time the tooth 34 engages the shoulder or abutment 38 of the staple bender so that the latter is retracted to allow the die elevating member 26 to move upwardly and restore the die 10 to normal position. The tooth 34 continues to move the staple bender backwardly, and also engages the lug 39 of the driver so that the latter moves with the bender to the position shown in Fig. 5, where the tooth 34 passes the staple driver and bender. The tooth 35 is just wide enough to engage the lug 39 of the staple driver and clears the shoulder 38 of the staple bender, but the tooth 34 is wide enough to engage both the projection 39 and shoulder 38 to effect simultaneous movement of the staple bender and driver during the final part of the movement of both. The bender has a one-step movement both forward and backward and the driver has a one step forward movement and a two step return movement.

Figures 7, 8:
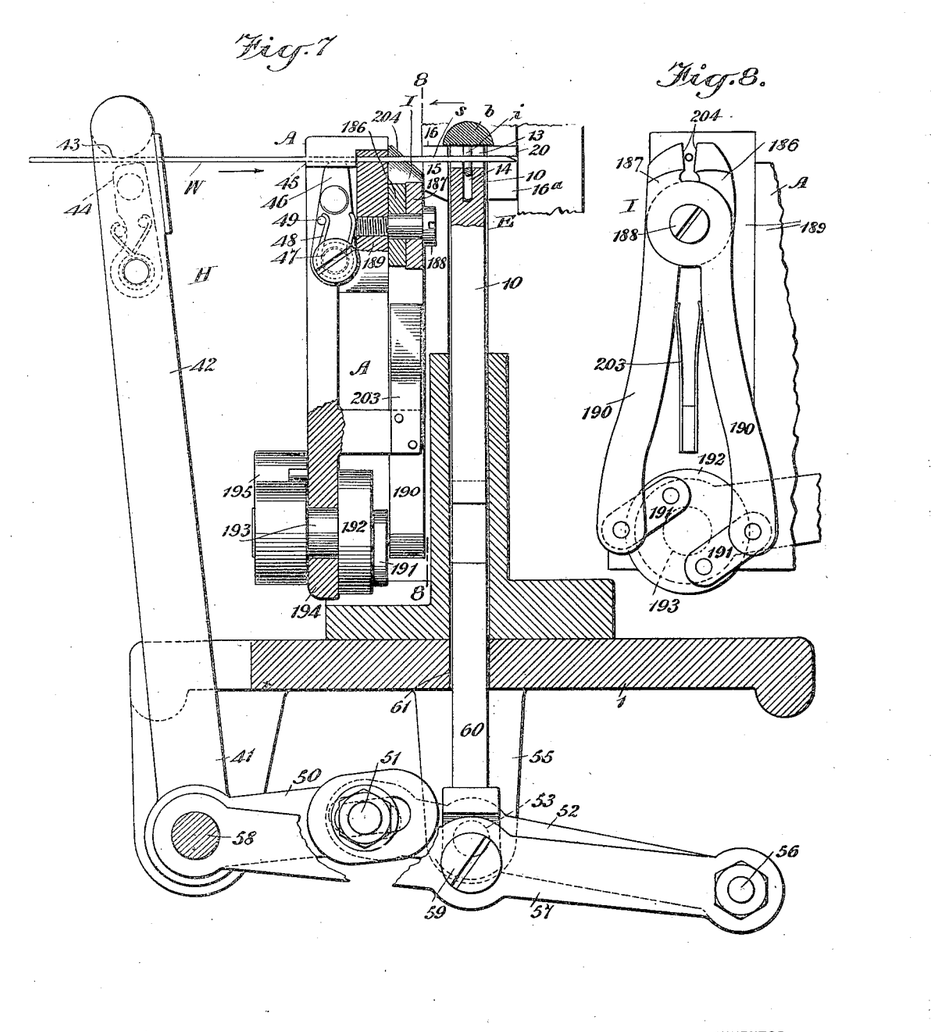
Fig. 7 is a transverse section showing the staple wire feeding and cutting mechanism.
Fig. 8 is a view of the wire cutter as seen on the line 8—8, Fig. 7.

The wire feeding mechanism H comprises, as shown in Fig. 7, a bell crank lever 41 which has an upwardly extending arm 42 provided at its upper extremity with a fixed jaw 43 with which coöperates a spring-pressed jaw 44, and between these jaws the wire w from which the staples are formed extends. In the adjacent wall of the machine frame A is a passage 45 through which the wire extends into the staple-forming mechanism, and extending through this passage is a spring-pressed gripping element or jaw 46 which is secured to the frame A by a pivot screw 47, and on this screw is a spring having an extremity 48 which engages a projection 49 of the jaw 46 to frictionally grip the extremity of the jaw with the wire so that movement of the latter into the machine, or to the right, Fig. 7, is permitted, and opposite movement is prevented. The spring-pressed jaw 44 on the lever 41 operates to grip the wire as the arm 42 of the lever moves to the right to feed the wire one step, but with the opposite movement of the lever the jaw 44 releases the wire, which latter is held tightly by the relatively stationary gripping jaw 46. The short arm 50 of the wire feeding lever 41 is connected by a pivot bolt 51 with a lever 52 fulcrumed at 53 on a depending bracket 55 on the bottom of the table 1. The outer end of the lever 52 is pivotally connected at 56 with a lever 57 which is pivoted on the fulcrum 58 for the lever 41. At the middle of this lever 57 is pivotally connected by a screw 59 a vertically reciprocating member 60 disposed directly under the die 10 and movable in an opening 61 in the table 1. The system of levers or connections between the element 60 and wire feeding lever 41 serves as motion multiplying means so as to feed the proper amount of wire to the staple-forming mechanism.

Figures 1, 1A:
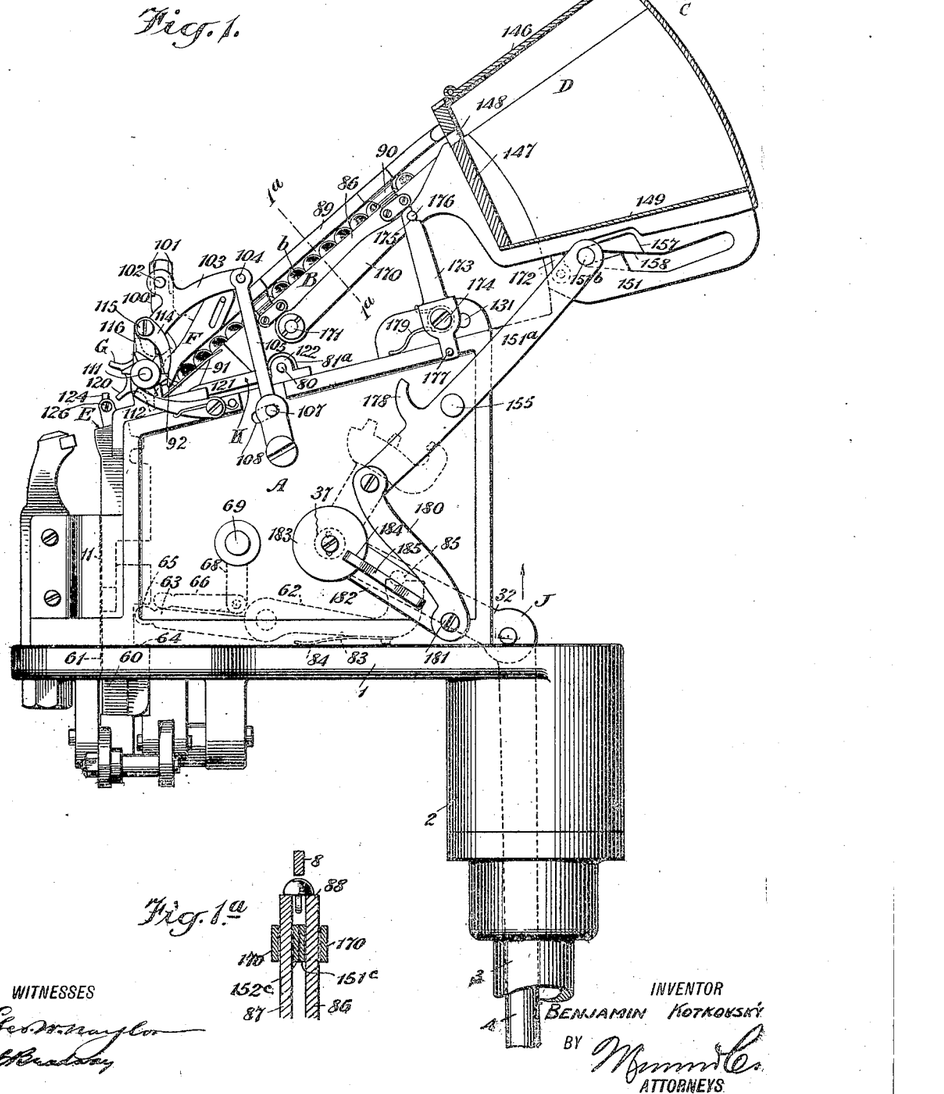
Figure 9:
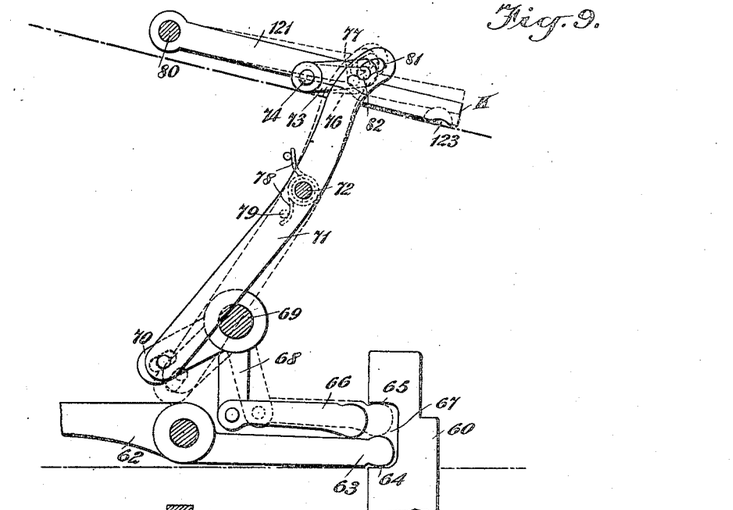
Fig. 9 is a detail view showing the means for operatively connecting the wire feeder with its actuator when a button is in assembled position to receive a staple.

The feeding of wire to the staple-forming mechanism depends upon the presence of a button in such mechanism, and consequently if a button fails to feed, no wire will be fed to the mechanism to cause clogging or imperfect working. A movable button holder K, Figs. 5 and 9, is mounted over the staple-forming mechanism, so that as a button is fed to the latter, the holder will be raised and thereby control the operation of the wire feeder H. The actuator for the wire feeder comprises a medially fulcrumed lever 62 which has an extremity 63 extending between two spaced abutments 64 and 65 in the member 60 of the wire feeding mechanism. The range of movement of the lever 62 is such that the extremity 63 will swing up and down between the abutments 64 and 65 without imparting movement to the element 60, but this lost motion is taken up when the button is in staple-receiving position in the staple-forming mechanism, so that the lever 62 will cause the wire feeder to be actuated by movement being imparted by the lever 62 to the element 60. This lost motion take-up device comprises a member 66 resting on the extremity 63 of the lever 62 and movable into the recess 67 formed between the abutments 64 and 65. The member 66 is connected with a crank arm 68 arranged within the frame of the machine and mounted on a rock shaft 69 on the outer end of which is a crank arm 70 that is hingedly connected at the lower end of a lever 71 fulcrumed at 72 on the outside of the frame A. The upper end of this lever 71 is connected with the button-holding device K by a crank 73, Fig. 3, which has a shaft 74 journaled in a bearing 75 on the frame A, which shaft has another crank arm 76 connected by a pin 77 with the button-holding device K. Consequently, when this button-holding device is raised by a button passing thereunder to staple-receiving position, the cranks 76 and 73 are raised, and thereby the lever 71 is moved from the full to the dotted line position, Fig. 9, so that the motion take-up device 66 is thrown into the recess 67 of the element 60, so that as the actuating lever 62 of the wire feeding mechanism is moved, the staple wire will be fed another step into the machine for supplying the blank for the next staple. The lost motion take-up device 66, Fig. 9, is withdrawn from the element 60 when the button-holding device K drops by means of a spring 78 coiled around the fulcrum 72 and having one end engaging a projection 79 on the lever 71, so as to move the latter from the dotted to the full line position. Owing to the position of the pivotal center 80 of the button-holding device K with respect to the fulcrum 72 of the lever 71, a slot 81 is provided in the upper end of the lever 71 to receive the pin 82 on the crank 73. The means for operating the wire feed actuating lever 62 within the frame A comprises a leaf spring 83 fastened to the lever and having its free end 84 bearing on the table 1, as shown in Fig. 1, and on the main lever J of the machine is a projection 85 carried by the arm 32 and so arranged as to move downwardly into engagement with the rear end of the lever 62 for the purpose of pressing such rear end downwardly in opposition to the tension of the spring 83, so as to throw the front end 63 of the lever 62 upwardly to actuate the wire feeding lever 41, Fig. 7, in a direction to feed wire to the staple-forming mechanism and when the main lever J moves upwardly, as when pressure is applied to the foot treadle, the spring 83 of the lever 82 will cause the wire feeding lever 41 to move outwardly to take another bite on the wire to be fed.

Figure 4:
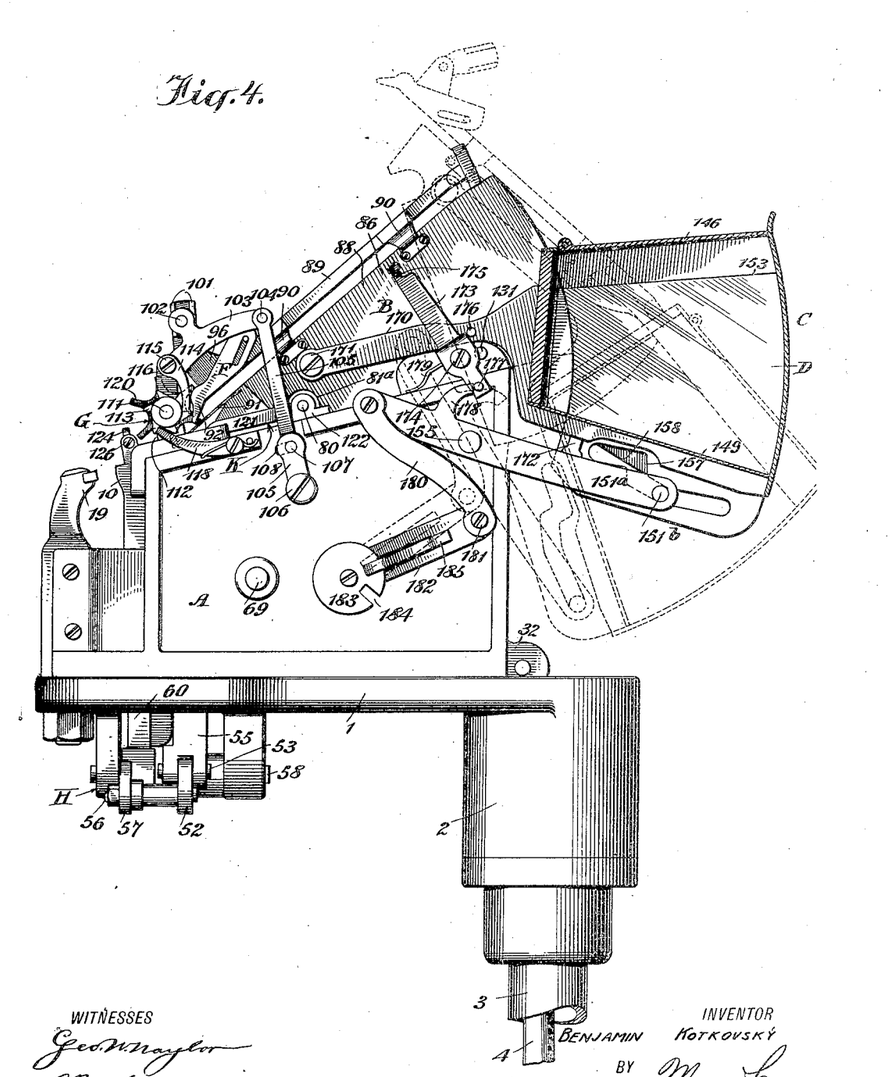
Fig. 4 is a view similar to Fig. 1, showing the hopper in lowered or idle position, as when a feed chute is being fed by hand with a style of button different from that in the hopper.

The feed chute or raceway B comprises a pair of vertically disposed triangular plates 86 and 87 which are secured together in spaced relation, so that the inclined upper edges 88 will form a raceway for the buttons to slide down, and by spacing the plates 86 and 87 apart a longitudinal groove is provided in this raceway for the shanks or eyes of the buttons. A guard 89 extends longitudinally of the raceway and is spaced above the edges 88, so that it is impossible for the buttons to be thrown out of the raceway, such guard being fastened to the plates of the chute by brackets 90. At the lower end of the chute and forming extensions of the edges 88 of the plates of the chute are springs 91 which support the buttons as they are being conducted from the chute to the staple-forming mechanism, the springs being yielding so as to accommodate buttons of different sizes. Reciprocating over this yielding extension of the chute formed by the springs 91 is the ejector F, which has a bifurcated lower extremity 92 which is adapted to engage slightly above the center of the lowermost button in the chute so as to eject such button as the ejector moves downwardly from the position shown in Fig. 6 to that shown in Fig. 5. This ejector is slidably mounted on the lower end of the button guard 89, and on this guard is a stop or gate element 93 in the form of a spring extending over the buttons and having its lower end free so as to yieldingly hold the buttons in the chute. On the guard is a pin 94 arranged with its lower end bearing on the spring 93 and the upper end of the pin is adapted to be engaged by a cam surface 95 on the ejector, so that as the latter is moved to eject a button the cam 95 will press the spring downwardly so that its free extremity will be in the path of the descending next button as the lowermost button is being forced out by the ejector F. This tensioning of the spring by the pin 94 does not take place until after the lowermost button has passed out of gripping relation to the spring or gate 93. The reciprocation of the ejector is performed by a toothed segment 96 pivoted at 97 on extension lugs 98 of the guard 89, and the teeth of the segment mesh with rack teeth 99 on the ejector. The segmental gear 96 is provided with an arm 100 formed with parallel lugs 101 between which engages a pin 102 on a reciprocating actuating element or link 103. This link, as shown in Fig. 4, is hingedly connected at 104 with the upper end of a swinging arm 105 which is fulcrumed at 106 on the side of the frame A. This arm 105 is provided with a pin 107 which extends into the frame A through a slot 108, the inner end of this pin 107 engaging between spaced shoulders 109 and 110, Fig. 10, in the adjacent flange 22 of the staple bender 15, so that as the staple bender nears the end of its forward stroke the pin 107 is engaged by the shoulder 109, and the button ejector is retracted to the position shown in Fig. 6, and as the bender moves backwardly and nears the end of its stroke the pin 107 will be engaged by the shoulder 110 and cause the button ejector to move forwardly and eject a button.

The button feeder or star wheel G is located between the button ejector and staple-forming mechanism and is mounted on a shaft 111 journaled in a bearing 112, and on this shaft is a ratchet wheel 113 with which engages a pawl 114 pivoted at 115 on an arm 116 loosely mounted on the star wheel shaft 111. The pawl-carrying arm 116 is connected by the pivot screw 117 with the link 108, as clearly shown in Figs. 5 and 6, so that as the link moves back and forth it will oscillate the pawl-carrying arm and move the pawl 114 into engagement with the successive teeth of the ratchet wheel 113 to move the same step by step, and consequently move the star button feeding wheel in the same manner. A spring-pressed pawl 118, Fig. 4, also engages the ratchet wheel so as to prevent back travel thereof. The star wheel G moves one step with each ejecting movement of the ejector F, and the teeth or arms 120 of the star wheel successively engage buttons to deliver them to the staple-forming mechanism. The button holder K is an approximately rectangular frame having its side members 121 spaced apart with their rear ends fulcrumed on the screw pivot 80 which passes through recesses 81ª in the plates 86 and 87 of the button chute B, the screw being fastened in a bearing 122, Fig. 4. The lower portion of the star wheel lies between the side members 121 of the button holder, and the ejector F moves downwardly between these members in ejecting a button. The under side of the holder K near its free end is provided with an approximately semi-circular recess 123 which is adapted to receive the head of a button when the latter is in staple-receiving position, as shown in Fig. 5, whereby the button is held properly in place. The star wheel G moves the button from the ejector toward the button-receiving recess 123. The head of the button during this movement from the ejector first slides on the resilient members or springs 91 and thereafter on the top surface of the staple bender 15 and staple driver 18. The holder K is provided with a button retainer or guide 124 which embodies a pair of rearwardly and upwardly curved fingers 125 extending along opposite sides of the bottom portion of the star wheel, this button retainer being pivoted at 126 and yieldingly pressed downwardly by a spring 127, so as to lie in the path of the button that is fed by the star wheel. The button as it feeds under the guide 124 and holder K will lift the latter so that it will control the wire-feeding mechanism as hereinbefore described. To assist the star wheel in moving the button to staple-receiving position the staple driver is provided with a button shank-engaging element 128 arranged in the slot 129 which is provided in the driver for allowing the shanks of the buttons to pass into staple-receiving position. This element 128 is adapted to yield to allow the shanks of the buttons to pass along by the star wheel, and as soon as the shanks pass the tip 130 of the element 128, the latter is thrown upwardly by a spring 131' acting on this element, and consequently as the driver moves forwardly to drive a staple, the element 128 will at the same time carry the next button into position to be received by the holder K, so that when the parts of the staple forming the driving mechanism return to normal position, the button will be ready to receive a staple wire from the wire-feeding mechanism. Immediately after receiving the wire the bender comes into play to form the staple, and thereafter the driver acts to drive the staple into the fabric and attach the button. The feeding movement of the star wheel occurs as the driver is nearing the end of its backward stroke and causes the button to assume a position where the shank will be in front of the element 128, so that with the next stroke of the driver a button will be moved to staple-receiving position, while at the same time a button-supplied staple will be attached to the shoe or other article.

Figure 2:
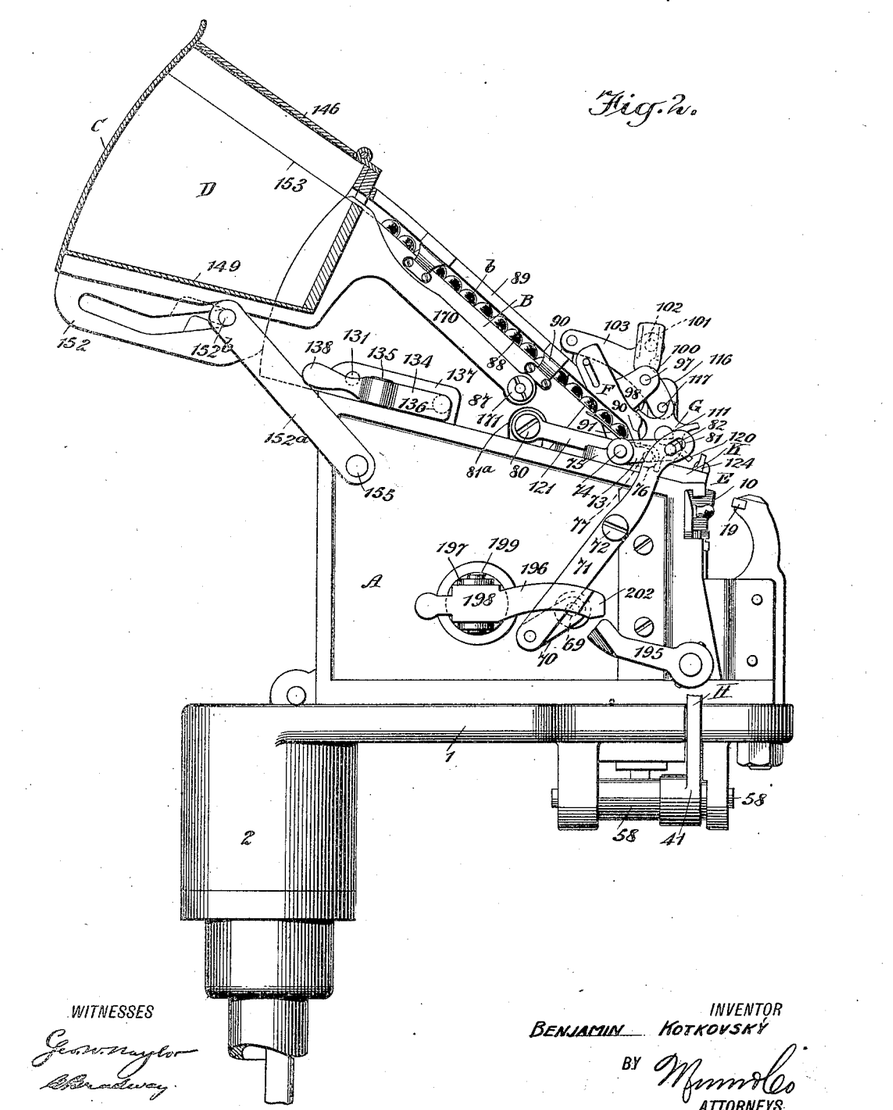
Fig. 2 is a view taken from the opposite side of Fig. 1, with the hopper in section.
Figure 3:
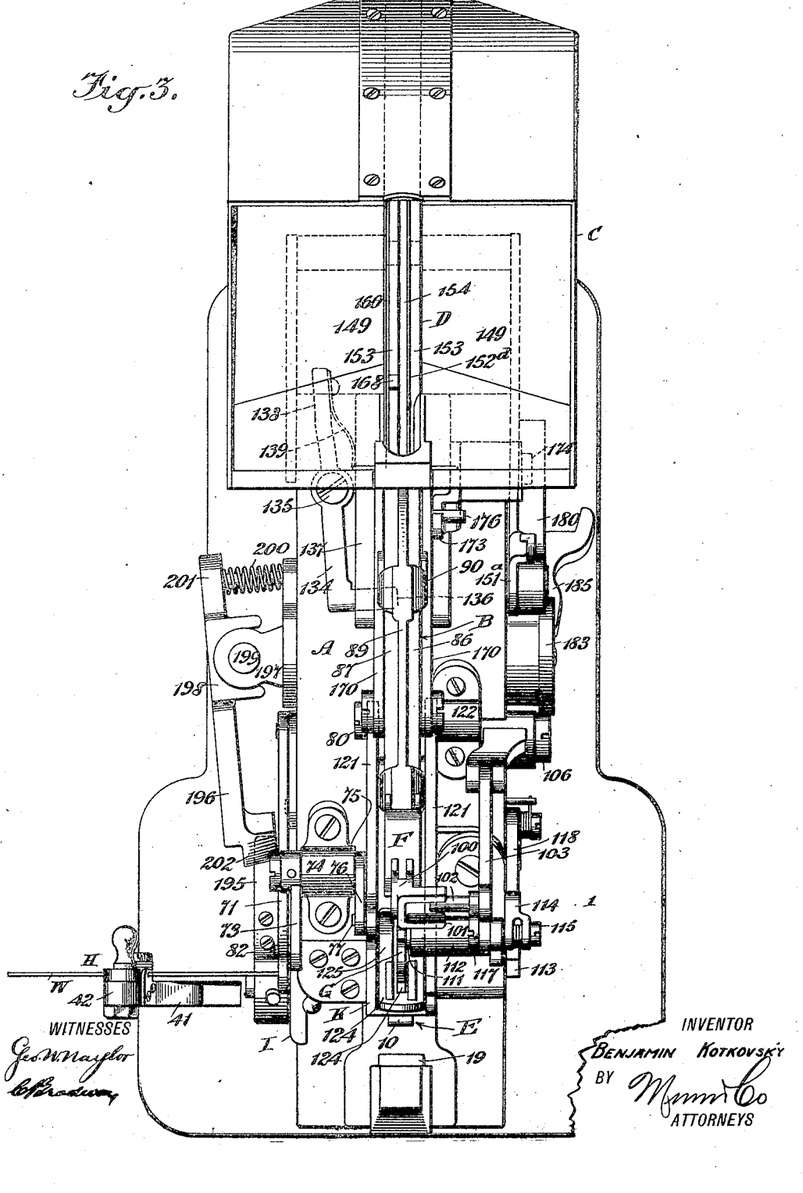
Fig. 3 is a plan view of the machine.

To permit access to the button-feeding means, as well as to the staple-forming mechanism, the feed chute B is pivotally mounted on a pivot 131 on the rear upper corner of the frame A, and consequently the chute can be tilted to the dotted-line position, Fig. 4. A catch 134, Figs. 2 and 3, is arranged to lock the chute in normal position. This catch is mounted on a pivot stud 135 and has a pin 136 which passes through a bearing bracket 137 on which the chute is pivoted, and this pin is adapted to engage with the chute to hold the same in normal position. By pressing the handle 138 of the latch 134 against the tension of the spring 139, Fig. 3, the latch can be released so that the chute can be moved to the dotted-line position, Fig. 4. In throwing out the chute in this manner the pin 102 on the link 103 disengages the ejector which is carried by the chute while the link 103 remains in position. This throwing back of the chute B is also made use of to empty the chute of its buttons, as the buttons in the chute will slide back into the hopper C, so that the chute can be used for the hand feeding of buttons of a different size from the buttons in the hopper, it being understood that the hopper will, during the hand feeding, remain in the full-line position, Fig. 4, so that buttons can be placed in the upper end of the chute without the hopper interfering.

To prevent the buttons in the chute from emptying out as the chute is being thrown back, an automatic gate or stop device 140, Fig. 5, is employed to move into engagement with the button in the lower end of the chute and prevent the button from sliding out. This device 140 is pivoted at 141, and its button-engaging tip 142 is normally retracted out of the path of the buttons in the chute by the extremity 143 engaging an abutment 144 which is stationary with respect to the table or frame of the machine. A spring 145 carried by the chute presses on the gate device 140 so that when the chute begins to move out of its normal position the tip 142 of the gate device will move into the feed groove of the chute or raceway and engage the shank of the button in the bottom of the chute. It will thus be seen that the gate device 140 is automatically closed and opened with the movement of the chute from or to operative position.

The hopper C is a metal or other box having a cover 146. The front wall 147 of the hopper has an opening 148 which is adapted to aline with the chute B, so that buttons can pass out of the opening into the chute. The bottom 149 slopes downwardly from both sides, and in the center is provided with a slot 150 through which the button pick-up device D works up and down. The button pick-up device comprises a pair of vertically sliding plates 151 and 152. The upper edges 153 of the plates are beveled inwardly so as to better pick up the buttons in the hopper, and these plates are spaced apart to provide a longitudinal groove 154 between them to accommodate the shanks or eyes of the buttons while the heads of the latter rest on the upper edges 153 of the plates, and these plates when fully raised are in alinement with the chute, so that the buttons can flow by gravity down the plates and into the chute through the opening in the front wall of the hopper. The pick-up plates 151 and 152 are actuated respectively by levers 151$^a$ and 152$^a$ connected together by a horizontal shaft 155 journaled in the upper rear corner of the frame A. These levers have on their upper rear ends pins 151$^b$ and 152$^b$ movable in slots 157 and 158 on the plates 151 and 152, respectively, the said slots being of different configurations and so disposed that as the levers 151$^a$ and 152$^a$ are oscillated the plates will move up and down in the hopper, but only those buttons that have their eyes or shanks extending down will be caught on the pick-up device and feed into the chute.

The hopper C is adapted to have an up and down oscillatory movement, and for this purpose it is provided with forwardly-extending arms 170 which are disposed at opposite sides of the chute B and are pivoted thereto by a horizontal pivot 171 which also serves as a pivot for the forwardly-extending arms 151$^c$ and 152$^c$ of the pick-up plates 151 and 152, the arms of the said latter plates being disposed between the plates forming the button chute. The hopper is adapted to drop by its own weight after the pick-up plates have moved to their lowermost position, and is adapted to be raised by the button pick-up device as the same moves upwardly, and for this latter purpose the plate 151 has a projection 172 on which the bottom of the hopper rests as a pick-up device D is moved upwardly by the levers 151$^a$ and 152$^a$. A trip lever 173 is mounted on the frame A and swings on a pivot 174. The upper end of this trip lever or catch has a notch 175 in which engages a projection 176 on the arm 170 of the hopper C, as shown in Fig. 1, and on the lower end of the trip lever is a projection 177 that is located in the path of a projection 178 on the lever 151$^a$, so that as the said lever tilts during the downward movement of the button pick-up device D, the trip lever will be actuated so as to release the hopper and allow the same to drop, whereby the buttons in the hopper are agitated, and more effectively lodge on the pick-up device. A spring 179 is coiled around the fulcrum 174 of the trip lever 173 and automatically returns the latter to a position where it will engage the projection 176 of the hopper when the latter is raised, so as to thereby support the hopper in raised position until it is again tripped. The lever 151$^a$ for the button pick-up device is connected by a link 180 which is connected at 181 with an arm 182 secured to the shaft or axis 37 of the lever J. This arm 182 is loose on the shaft 37 and is adapted to be clutched thereto when the buttons are to be fed automatically to the staple-forming and attaching mechanism. For clutching the parts together the shaft 37 has a disk 183 provided with a notch 184, and a catch 185 pivoted on the lever 182 is adapted to be engaged in the notch 184 of the disk 183, shown in Fig. 1, but when the catch 185 is released, as shown in Fig. 4, the hopper will be in lowered or inoperative position, so that buttons can be fed to the chute by hand while the rest of the machine will operate as usual, with the exception of the button pick-up device and the hopper.

Figures 12, 12A:
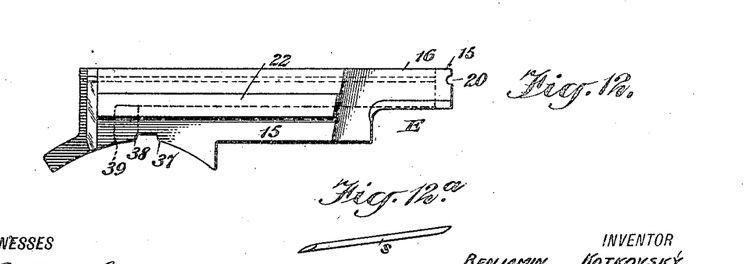

The wire blank $s$ from which the staple is made has its ends cut obliquely as shown in Fig. 12$^a$, so that when the staple is formed, these pointed ends will freely pass through the fabric without tearing the fibers. This beveled shape of the ends of the wire is effected by means of a cutting device I, shown clearly in Figs. 7 and 8. This device comprises a pair of jaws 186, 187, connected together by a pivot 188 which is a stud screw serving as shown in Fig. 7, to fasten the cutting blades or jaws to the part 189 of the frame A. The cutting jaws have arms 190 which are connected by links 191 with an oscillatory disk 192. This disk has a shaft 193 which extends outwardly through the part 194 of the frame A, and has an arm 195 fastened thereto. This arm, as shown in Fig. 3, is adapted to be engaged by a swinging arm 196 fastened to the end of the main lever shaft 37. This shaft has a bifurcated head 197 in which the portion 198 of the lever 196 is disposed, and a pin pivot 199 pivotally connects the arm 196 to the head 197. A spring 200, as shown in Fig. 3, is interposed between the rear end 201 of the lever 196 and the adjacent side of the frame, so that the lever 196 can have a lateral movement. The free extremity 202 of the lever is adapted to move downwardly and engage the arm 195 and cause the pliers or cutters to close and sever the wire for the staple, and in moving downwardly the arm 196 releases and passes beyond the arm 195, and thereupon the arm 195 springs upwardly, this being effected by reason of a spring 203, Fig. 8, disposed between the members 190 of the cutters. As the arm 196 moves upwardly it wipes by the arm 195, and in so doing is pressed laterally by a cam action between the parts until the arm 196 snaps inwardly over the arm 195, so as to be ready to again operate the cutting mechanism. It will be understood that this operation of the cutting means takes place immediately as the staple bender begins to move forwardly to bend the cut wire into a staple. As shown in Fig. 7, the cutting edges 204 of the jaws are beveled or inclined obliquely to the axis of the wire w, and consequently the ends of the wire staple blank s will be beveled to form piercing points.

Having thus described my invention, I claim as new and desire to secure by Letters Patent:

1. A button attaching machine including a staple driver having a slot in which the eye of a button is adapted to enter, and means in the slot to engage the button eye for carrying the button to staple receiving position during the staple driving stroke.

2. A button attaching machine including a longitudinally slotted staple driver, means for feeding buttons to the driver with the eyes of the buttons engaging in the slot thereof, and means movable with the driver and engageable with the button eye in the slot for moving the button to staple receiving position during the staple driving stroke.

3. A button attaching machine comprising a staple bender, a staple driver, means for feeding buttons successively to receive a staple, and a lost-motion connection between the said means and staple bender whereby the latter is the actuator for the said means.

4. A button attaching machine comprising a staple bender, spaced abutments thereon, a staple driver for moving a button to staple-receiving position while driving a staple having a button attached, and means actuated by the abutments of the bender for feeding buttons to the staple driver.

5. A button attaching machine comprising a button-feeding means, a wire-feeding means, a staple forming mechanism to which a button and a staple length of wire are successively fed, an actuator for the wire feeding means, a lost motion means between the actuator and wire feeding means for preventing actuation of the wire-feeding means upon failure of the feed of a button to the staple-forming mechanism, and a device actuated by a button for taking up the lost motion between the actuator and wire feeding means.

6. A button attaching machine comprising a button-feeding means, a wire-feeding means, a staple-forming mechanism to which a button and a staple length of wire are successively fed, an actuator for the wire-feeding means, a device engaged and moved by the button fed to the staple-forming mechanism, and means moved by the device for positively connecting the actuator with the wire-feeding means while a button is in the said mechanism and disconnecting the actuator when the button passes out of the mechanism.

7. A button attaching machine comprising a button-feeding means, a wire-feeding means, a staple-forming mechanism to which a button and a staple length of wire are successively fed, an actuator movable back and forth, and means separate from the wire feeding means and interposed in the path of the actuator when a button enters the staple-forming mechanism and withdrawn when the button leaves the mechanism, whereby the actuator actuates the wire-feeding means only when a button is in the said staple-forming mechanism.

8. A button attaching machine comprising a button-feeding means, a wire-feeding means, a staple-forming mechanism to which a button and a staple length of wire are successively fed, a reciprocatory element connected with the wire-feeding means, an actuator movable back and forth without actuating the element and wire-feeding means, and means including a member moved by a button in entering the staple-forming mechanism to transmit motion to the said element from the actuator and moved out of transmitting relation to the element and actuator by the button leaving the said mechanism.

9. A button attaching machine comprising a fastener-forming mechanism, a wire feeder including a reciprocating element, an actuator having a lost motion with respect to the element, means for feeding buttons to the fastener-forming mechanism, and a device operative only when a button is in the said mechanism for taking up the lost motion, whereby the actuator actuates the wire feeder by moving the said element thereof.

10. A button attaching machine comprising a fastener-forming mechanism, a feeder for the fastener material, said feeder including an element having spaced abutments, an actuator movable back and forth between the abutments without imparting motion to the element and actuating the feeder, means for feeding buttons to the said mechanism, a device moved by contact with a button fed to the said mechanism, and a member inserted by the said device between the actuator and one abutment to cause the actuator to move the said element and actuate the feeder.

11. A button attaching machine comprising a fastener-forming mechanism, a feeder for the fastener material, said feeder including an element having spaced abutments, an actuator movable back and forth between the abutments without imparting motion to the element and actuating the feeder, means for feeding buttons to the said mechanism, a member insertible between the actuator and an abutment of the said element to move the latter with the actuator for operating the feeder, and a device raised by a button in entering the fastener-forming mechanism and lowered as the button leaves the said mechanism for inserting and retracting the said member.

12. A button attaching machine comprising a fastener-forming mechanism, a feeder for the fastener material, said feeder including an element having spaced abutments, an actuator movable back and forth between the abutments without imparting motion to the element and actuating the feeder, means for feeding buttons to the said mechanism, a member insertible between the actuator and an abutment of the said element to move the latter with the actuator for operating the feeder, a device raised by a button in entering the fastener-forming mechanism and lowered as the button leaves the said mechanism, and a motion transmitting means between the button-actuated device and said member for moving the latter into and out of engagement with the actuator and element.

13. A button attaching mechanism comprising a fastener-forming mechanism, means for feeding buttons successively thereto, a feeder for the fastener material, an element through which motion is imparted to the feeder and having spaced abutments, an actuator engaged between the abutments, a member slidable on the actuator and movable to fill the gap between the abutments and actuator whereby the latter will operate the feeder, a pivoted device under which the buttons feed to the fastener-forming mechanism and cause the device to move on its pivot, and means for transmitting motion from the said device to the said slidable member.

14. A button attaching machine comprising a staple-forming and driving mechanism, means for feeding wire thereto, a button feeding means, a holder for holding a button in the mechanism during the forming of the staple and movable to receive and release the button, and actuating means for the wire-feeding means, said actuating means consisting of two parts both engaged with the wire feed means and operative only when a button is held by the holder, and one of the parts being disengaged from the wire feeding means to prevent operation thereof when there is no button in the holder.

15. A button attaching machine comprising a staple-forming mechanism, means driven directly by the staple forming mechanism for feeding buttons thereto, a device separate from said means for holding a button in the mechanism during the forming of a staple and movable away from and toward the path of the button as the latter enters and leaves the mechanism, and a wire-feeding means controlled by the said device, whereby wire feeds only when a button is in the mechanism.

16. A button attaching machine comprising a staple-forming mechanism, means for feeding buttons thereto, a device separate from said means for holding a button in the mechanism during the forming of a staple and movable away from and toward the path of the button as the latter enters and leaves the mechanism, and a wire-feeding means controlled by the said device, whereby wire feeds only when a button is in the mechanism, said device consisting of a pivoted member extending along the path of the buttons to engage the same and having a seat in line with the staple-forming mechanism to grip a button and hold it in wire-receiving position.

17. A button attaching machine comprising a staple-forming die, a staple bender, a staple driver, a clenching die, means for feeding a wire to the forming die, means carried by the staple-driver for feeding a button to staple-receiving position, while the driver attaches another button to an article on the clenching die, a holder under which the button feeds and by which the button is held while receiving a staple wire, the button moving the holder by a cam action, and means controlled by the holder for actuating the wire-feeding means only when a button is under the holder.

18. A button attaching machine comprising a staple-forming mechanism, a button feeding chute, a device for feeding one button at a time from the chute to the said mechanism, a holder separate from the button feeding device and under which the button is received and held in staple-forming position and movable to receive and release the button, a wire feeder, and operating means controlled by the holder to feed wire only when a button is in staple-forming position.

19. A button attaching machine comprising a staple-forming mechanism, a button-feeding chute, a device for feeding one button at a time from the chute to the said mechanism, a holder separate from the button feeding device and pivoted at the discharge end of the chute and extending in the direction of feed of the buttons and terminating over the staple-forming mechanism, the free end of the holder having a seat for receiving and holding a button in the mechanism and the free end being movable as the button is received and released, and a wire-feeding mechanism controlled by the holder to feed wire to the staple-forming mechanism only when a button is therein.

20. A button attaching machine including a reciprocating staple-forming die, a reciprocatory bender, a pivoted member connected with the die and engaged by the bender during the last part of its bending stroke to disengage the die from the staple, and a spring acting on the member to return the die as the bender recedes.

21. A button attaching machine including a staple-forming die provided with a notch, a member having an end engaging in the notch to move the die, a bender coöperating with the die to form a staple, means on the member with which the bender engages on its staple-forming stroke to actuate the member and disengage the die from the staple, and means acting on the member to return the die to normal position as the bender recedes.

22. A button attaching machine including a staple bender, a staple driver having a one-step forward and a two-step backward movement, and an oscillatory actuating element engaging and driving the bender and driver.

23. A button attaching machine including a reciprocatory staple bender having a one-step movement forwardly and backwardly, a reciprocatory staple driver having a one-step forward and a two step backward movement, and an oscillatory actuating element having separate means for engaging and actuating the bender and driver.

24. A button attaching machine including an actuator having an arcuate movement, a staple driver movable tangentially to the line of movement of the actuator and having a range of movement less than the latter, and means on the actuator for engaging and reciprocating the staple driver by a one-step forward and a two-step backward movement.

25. A button attaching machine including an actuator having an arcuate movement, a staple driver movable tangentially to the line of movement of the actuator and having a range of movement less than the latter, a lug on the staple driver, means on the actuator to engage the lug for driving the driver, and a plurality of successively operative means on the actuator to return the driver to initial position.

26. A button attaching machine including a reciprocatory staple bender, a reciprocatory staple driver, an oscillatory actuator having members for engaging the bender and driver in successive order to form a staple, and then drive the same, a third member for engaging the driver for partially retracting the same, one of the first-mentioned members acting to complete the return of the driver, and a staple-forming die moved out of the path of the driver to permit the staple to be driven and movable back to normal position as the driver is partially retracted, one of said first mentioned members being arranged to engage the bender and driver to retract the same to initial position.

27. A button attaching machine comprising a staple die, a staple bender coöperating therewith, means actuated by the bender after the staple is formed for moving the die away from the formed staple, a staple driver operative after the die has been withdrawn from the staple, means for retracting the driver and permitting the die to return to initial position for receiving a button, means for returning the bender to initial position, and means actuated by the bender for feeding buttons successively to the die.

28. A button attaching machine comprising a staple-forming die, means for feeding buttons successively thereto, means for feeding wire to the die, a bender movable to form the wire into a staple, a lost-motion connection through which the bender actuates the button feeding means, means for moving the die to disengage the staple and button, a staple driver movable into engagement with and driving the staple after the die releases the latter, means for moving the staple driver backwardly far enough to permit the die to return to normal position for receiving a button, and means for moving the driver and bender backwardly to initial position.

29. A button attaching machine comprising a die for receiving a button and a staple wire, a bender coöperating therewith to form the wire into a staple, means for moving the die out of engagement with the finished staple, a driver for driving the staple, means for mounting the driver and bender to reciprocate, an oscillatory actuator, a tooth on the actuator for engaging the bender to move the same on its working stroke, a tooth on the actuator for engaging the driver to actuate the same on its working stroke, a third tooth arranged to engage the driver and partially return the same, and means for restoring the die to button and wire-receiving position when the driver is partially returned, said first-mentioned tooth being arranged to engage the driver to fully return the same during the return of the bender to initial position.

30. A button attaching machine comprising a die for receiving a button and a staple wire, a staple bender, means actuated by the staple bender for removing the die from staple-forming position as the bender moves after bending the staple, means for restoring the die as the bender moves on its return stroke, a driver movable into engagement with the staple to drive the same immediately after the die is removed from the staple, a reciprocatory actuator, a member thereon for engaging the driver to move the same throughout its working stroke, a member on the actuator for moving the driver during the initial part of its return stroke to make way for the return of the die to initial position, and a member on the actuator serving during one stroke of the latter to move the bender on its working stroke and on the backward stroke of the actuator to return the bender and driver to initial position.

31. A button attaching machine comprising a staple-forming mechanism, means for feeding buttons successively to the staple-forming mechanism, and a staple driver, said driver including a button shank engaging element for moving a button to staple-receiving position while a previous button is being attached to an article by the driver.

32. A button attaching machine comprising a staple-forming mechanism, a staple driver having a longitudinal slot for receiving the shank of a button, a yielding member in the slot for engaging the shank of a button and moving the same to staple-receiving position in the said mechanism while the driver is driving a staple, and means for reciprocating the driver to permit buttons to be supplied successively to the driver in a manner to engage the shanks in the slot and in front of the said yielding member, said member being yielding on the return stroke of the driver to pass by the shank of the next button to be fed to the staple-forming mechanism.

33. A button attaching machine comprising a staple-forming die, a bender for forming a staple on the die, means for moving the die after the staple is formed and leaving the staple in the bender, a staple driver, means carried by the staple driver for moving a button into a position to be received by the die and to receive a staple wire, and means for holding the button with respect to the die during the return stroke of the bender and driver.

34. A button attaching machine comprising a staple-forming die, a bender for forming a staple on the die, means for moving the die after the staple is formed and leaving the staple in the bender, a staple driver, means carried by the staple driver for moving a button into a position to be received by the die and to receive a staple wire, and a single actuating element for the bender and driver.

In testimony whereof I have signed my name to this specification in the presence of two subscribing witnesses.

BENJAMIN KOTKOVSKÝ.

Witnesses:
JOSEPH DUBÍ,
CHATTEN BRADWAY.

Copies of this patent may be obtained for five cents each, by addressing the "Commissioner of Patents, Washington, D. C."